US012723743B2

(12) United States Patent
Zhang

(10) Patent No.: US 12,723,743 B2
(45) Date of Patent: Sep. 1, 2026

(54) TRACK LAMP WITH ELASTICALLY BIASED CONVEX POWER CONNECTOR

(71) Applicants: SUZHOU OPPLE LIGHTING CO., LTD., Suzhou City (CN); OPPLE LIGHTING CO., LTD., Shanghai (CN)

(72) Inventor: Wang Zhang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 19/193,921

(22) Filed: Apr. 29, 2025

(65) Prior Publication Data

US 2025/0257866 A1 Aug. 14, 2025

Related U.S. Application Data

(63) Continuation of application No. PCT/CN2023/129037, filed on Nov. 1, 2023.

(30) Foreign Application Priority Data

Nov. 1, 2022 (CN) ........................ 202222890594.0

(51) Int. Cl.

*F21V 21/005* (2006.01)
*F21S 8/06* (2006.01)
*F21V 23/06* (2006.01)

(52) U.S. Cl.

CPC ............ *F21V 21/005* (2013.01); *F21S 8/066* (2013.01); *F21V 23/06* (2013.01)

(58) Field of Classification Search

CPC ...... F21V 21/005; F21V 21/88; F21V 21/088; F21V 17/16; F21V 21/06; F21V 21/34; F21V 21/35; F21S 8/066; F21S 8/063

(Continued)

(56) References Cited

U.S. PATENT DOCUMENTS 3,603,918 A * 9/1971 Woertz ................ H01R 25/142 439/94
3,832,673 A * 8/1974 Le Hir .................. H01R 25/14 200/51 R (Continued)

FOREIGN PATENT DOCUMENTS

CN 204513291 U 7/2015
CN 111878737 A 11/2020

(Continued)

OTHER PUBLICATIONS

International Search Report issued in PCT Application No. PCT/CN2023/129037 dated Jan. 18, 2024, (4p).

*Primary Examiner* — Ismael Negron
(74) *Attorney, Agent, or Firm* — Arch & Lake LLP

(57) ABSTRACT

A track lamp includes a track having a power transmission bar, and an electrical connection device in electrical contact with the track. The electrical connection device includes a substrate, a power supply structure plugged and fixed on the substrate, and an elastic member arranged between the substrate and the power supply structure. The power supply structure features a convex portion in electrical contact with the power transmission bar. The elastic member is configured to bias the convex portion and the power transmission bar against each other, such that the convex portion and the power transmission bar are kept in contact with each other.

9 Claims, 5 Drawing Sheets

(58) Field of Classification Search
USPC .......................................... 362/648, 220, 147
See application file for complete search history.

(56) References Cited

U.S. PATENT DOCUMENTS

| | | | | | |
|---|---|---|---|---|---|
| 4,139,252 | A * | 2/1979 | Gorny | H01R 25/142 439/94 |
| 4,190,309 | A * | 2/1980 | Glass | H01R 25/142 439/118 |
| 4,533,190 | A * | 8/1985 | Booty | H01R 25/14 439/110 |
| 4,975,071 | A * | 12/1990 | Bedocs | F21V 21/34 439/121 |
| 6,325,645 | B1 * | 12/2001 | Schuite | F21V 21/35 439/118 |
| 10,172,483 | B2 * | 1/2019 | Chen | H01R 13/6205 |
| 10,677,433 | B2 * | 6/2020 | Cho | F21V 23/06 |
| 12,233,756 | B2 * | 2/2025 | Moulin | B60N 2/0722 |
| 2003/0031018 | A1 | 2/2003 | Bray et al. | |
| 2003/0223234 | A1 * | 12/2003 | Tang | H01R 25/142 362/648 |
| 2011/0051433 | A1 * | 3/2011 | Kao | H01R 25/147 362/396 |
| 2024/0353077 | A1 * | 10/2024 | Yu | F21V 21/35 |

FOREIGN PATENT DOCUMENTS

| | | | |
|---|---|---|---|
| CN | 214370016 | U | 10/2021 |
| CN | 218599653 | U | 3/2023 |
| CN | 218763075 | U | 3/2023 |
| DE | 202018102643 | U | 8/2019 |

* cited by examiner

55

TRACK LAMP WITH ELASTICALLY BIASED CONVEX POWER CONNECTOR

CROSS-REFERENCE TO RELATED APPLICATIONS

The present application is based upon and claims the priority of PCT patent application No. PCT/CN2023/129037 filed on Nov. 1, 2023 claims the priority of the Chinese patent application with application No. 202222890594.0, filed on Nov. 1, 2022, the entire contents of which are hereby incorporated by reference herein for all purposes.

TECHNICAL FIELD

The present disclosure relates to a track lamp, belonging to the technical field of lighting equipment.

BACKGROUND

In order to meet the needs of quick disassembly and assembly, a track lamp uses a copper sheet to draw electricity from the track. The copper sheet is mostly fixed with a compression spring structure, which supports the copper sheet. When the lamps are installed on the track, the copper sheets and the copper bars of the track have an interference fit, and the springs are always in a compressed state, so that the copper sheets are close to the copper bars to meet the power supply requirements.

SUMMARY

The present disclosure provides a track lamp.

Accordingly, the track lamp provided in this disclosure may include a track and an electrical connection device in electrical contact with the track, in which the electrical connection device may include a substrate, a power supply structure plugged and fixed on the substrate, and an elastic member arranged between the substrate and the power supply structure, the power supply structure may be provided with a convex portion, to be in electrical contact with a power transmission bar in the track; and the elastic member may be configured to generate elastic deformation in a case that the convex portion and the power transmission bar are pressed against each other, so that the convex portion and the power transmission bar may be kept abutting against with each other.

It is to be understood that both the foregoing general description and the following detailed description are exemplary and explanatory only and are not restrictive of the present disclosure.

DETAILED DESCRIPTION

Figure 1:
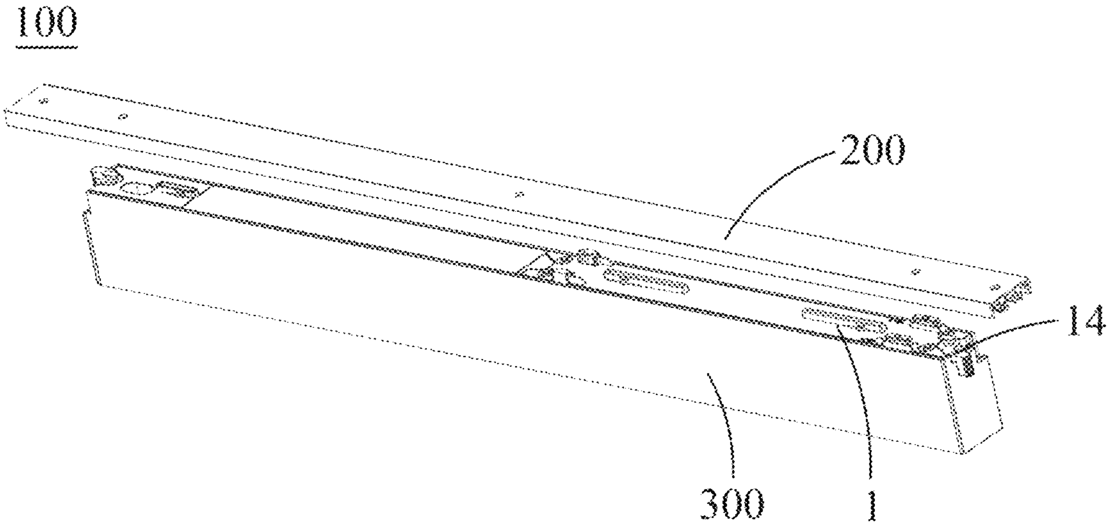
FIG. 1 is a perspective schematic diagram of a track lamp according to an example of the present disclosure.

In order to make the purpose, technical solutions and advantages of the present disclosure clearer, the present disclosure will be described in detail below with reference to the accompanying drawings and examples.

Explanation of the reference numerals in this disclosure may include:

track lamp 100, track 200, power transmission bar 201, conductive groove 202, lock buckle groove 203;

lamp 300, electrical connection device 1, shell 2, light-emitting component 3, substrate 11, through hole 112, boss 113, elastic member 15, power supply structure 12, convex portion 121, support plate 122, connecting part 123, abutting surface 124, circuit board 13, lock catch 14.

Sometimes, the new track lamps on the market have reduced their size to meet the requirements of ultra-thin and ultra-narrow tracks. Due to the limited size, it is impossible to place a compression spring structure in the track lamp to obtain power. Therefore, the demand for obtaining power from the track can only be met through the plastic deformation of the copper sheet itself. However, due to the poor plastic resilience of the copper sheet, it is difficult to rebound or the resilience is insufficient, so the reliability of using the copper sheet's own deformation and rebound to support the track copper bar to obtain power is not high. At the same time, after the copper sheet is installed once, the copper sheet is deformed and the protrusion moves down. When it is installed again, it may cause difficulty in obtaining power, which is not conducive to the repeated installation of the lamp.

In view of this, it is necessary to improve the track lamps to solve the above problems.

Figure 2:
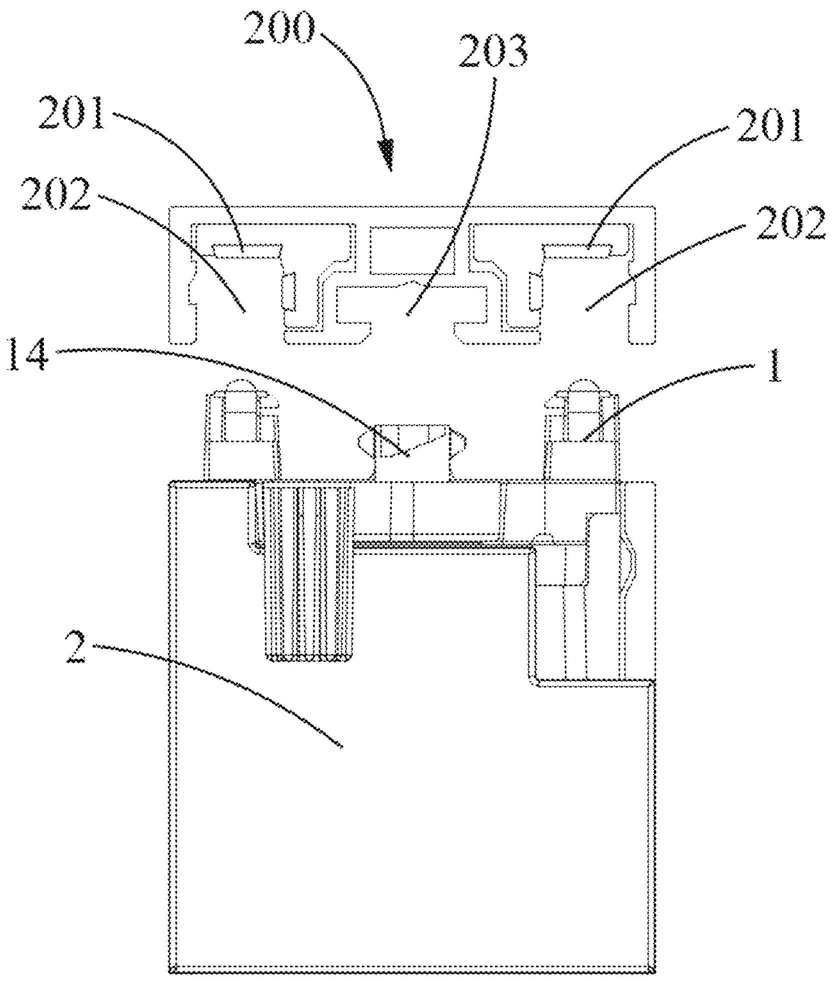
FIG. 2 is a cross-sectional view of the track lamp in FIG. 1.
Figure 3:
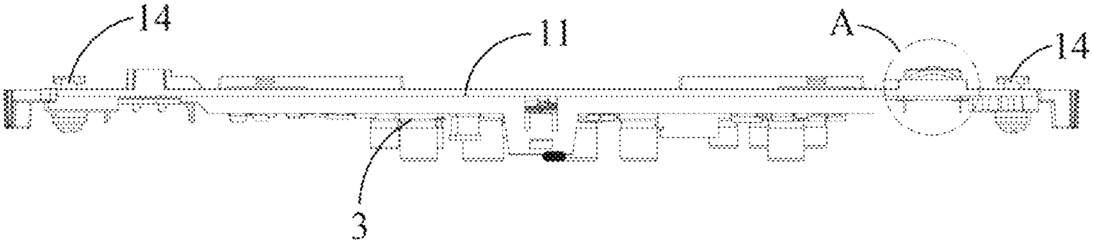
FIG. 3 is a perspective schematic diagram of the electrical connection device in FIG. 1.

Referring to FIG. 1 to FIG. 3, the present disclosure discloses a track lamp 100 for providing movable lighting to the outside world. The track lamp 100 includes a track 200 and a lamp 300 detachably connected to the track 200. An external power source is connected to the track 200, and the track 200 is electrically connected to the lamp 300. The lamp 300 is powered by the track 200, so that the lamp 300 emits light and illuminates the object.

Among them, the lamp 300 includes an electrical connection device 1, a shell 2 and a light-emitting component 3. A receiving space (not shown) is provided in the shell 2. The electrical connection device 1 matches the shell 2 and is arranged on the top of the shell 2, so that a part of the electrical connection device 1 can be accommodated in the receiving space and the receiving space is covered at the same time. A side of the electrical connection device 1 away from the shell 2 is in electrical contact with the track 200, and the light-emitting component 3 is accommodated in the receiving space and electrically connected to the electrical connection device 1. This arrangement enables the track 200 to power the light-emitting component 3 through the electrical connection device 1.

Specifically, please refer to FIG. 2 and FIG. 3, the electrical connection device 1 includes a substrate 11, the substrate 11 is connected to the shell 2 and covers the light-emitting assembly 3 accommodated in the shell 2, a lock catch 14 is provided on the substrate 11, and a lock buckle groove 203 is provided on the track 200. When the substrate 11 is connected to the track 200, the lock catch 14 is accommodated in the lock buckle groove 203. Specifically, there are two lock catches 14, which are arranged at two ends of a long side direction of the lamp 300, and there is one lock buckle groove 203, which is arranged in the middle of the track 200 and extends along the track 200. The substrate 11 is also provided with a power supply structure 12 electrically connected to the track 200, and the extension direction of the power supply structure 12 is the same as the extension direction of the lock catch 14. In this way, on the one hand, the lamp 300 is fixedly connected to the track 200 through the lock catch 14, and on the other hand, the track 200 supplies power to the lamp 300 through the power supply structure 12.

Since the specific structure of the track 200, the specific structure of the lock catch 14, the specific structure of the light-emitting assembly 3, the specific structure of the substrate 11, and the connection relationship between the substrate 11 and the shell 2 can all be designed according to existing technical solutions, which will not be described in detail herein.

The main improvements of the present disclosure lie in the power supply structure 12, the connection relationship between the power supply structure 12 and the light-emitting component 3, and the connection relationship between the power supply structure 12 and the substrate 11. Therefore, the following specification will describe the specific structure of the power supply structure 12, and the connection relationship between the power supply structure 12 and the substrate 11, and the connection relationship between the power supply structure 12 and the light-emitting component 3 respectively in detail.

Figure 9:
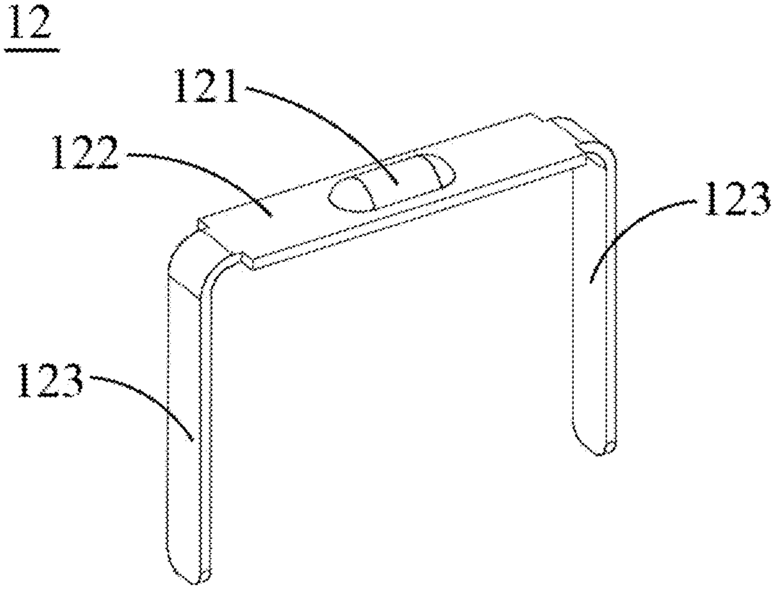
FIG. 9 is a three-dimensional schematic diagram of the power supply structure in FIG. 5.

Please refer to FIG. 3 to FIG. 6 and in combination with FIG. 9, the electrical connection device 1 includes a substrate 11, a power supply structure 12 plugged and fixed on the substrate 11, and an elastic member 15 arranged between the substrate 11 and the power supply structure 12. The power supply structure 12 is provided with a convex portion 121 to be in electrical contact with a power transmission bar 201 in the track 200. The elastic member 15 is configured to generate elastic deformation when the convex portion 121 and the power transmission bar 201 are pressed against each other, so that the convex portion 121 and the power transmission bar 201 are kept abutting against with each other. With this arrangement, the power transmission bar 201 can continuously transmit power to the power supply structure 12, thereby ensuring the connection stability between the electrical connection device 1 and the track 200.

Specifically, the power supply structure 12 includes a horizontally extending support plate 122 and connecting parts 123 vertically connected to both ends of the support plate 122, in which the support plate 122 is arranged in parallel with the substrate 11, and the support plate 122 is arranged on a side of the substrate 11 away from the light-emitting component 3, and the connecting parts 123 are arranged perpendicular to the support plate 122. Through holes 112 are provided on the substrate 11 for the connecting parts 123 to pass through, and the through holes 112 pass through the substrate 11, and a size of each of the through holes 112 is slightly larger than a size of each of the connecting parts 123, so that the connecting parts 123 can pass through the substrate 11 and move in the through holes 112. With such a configuration, the power supply structure 12 can move relative to the substrate 11. When subjected to external force, the power supply structure 12 compresses the elastic member 15 and moves relative to the substrate 11. When the external force disappears, the elastic member 15 pushes the power supply structure 12 to return to its initial state.

In this example, two connecting parts 123 are provided, and the two connecting parts 123 are respectively connected to the two ends of the support plate 122, that is, the power supply structure 12 is arranged in an inverted "U" shape, and two through holes 112 are provided to match the connecting parts 123, so that the two connecting parts 123 can pass through the through holes 112 to extend into the accommodating space. In other examples, there can be only one connecting part 123 or three connecting parts 123, as long as the connecting part 123 can connect the two sides of the substrate 11 and can move in the through hole 112, which is not limited herein.

The convex portion 121 is arranged on the support plate 122 and extends from the support plate 122 toward the track 200, so that when the electrical connection device 1 is connected to the track 200, the convex portion 121 can abut against the power transmission bar 201 to realize the power transmission between the electrical connection device 1 and the track 200. Specifically, the support plate 122 is arranged in a flat plate shape, and the convex portion 121 is arranged in an elliptical shape. The convex portion 121 is arranged in the middle position of the support plate 122 and its size is much smaller than the size of the support plate 122. In other examples, the convex portion 121 can be arranged at the edge position on the support plate 122, and the shape of the convex portion 121 can be a long strip or other shapes, which is not limited herein.

In a length direction of the track lamp 100, the elastic member 15 is arranged between the two through holes 112, and one end of the clastic member 15 abuts against the support plate 122, and the other end of the elastic member 15 abuts against the substrate 11. When the electrical connection device 1 is connected to the track 200, the power transmission bar 201 abuts against the convex portion 121 and applies pressure to the convex portion 121, so that the support plate 122 moves toward the substrate 11. At this time, the elastic member 15 is pressed until the force applied by the power transmission bar 201 to the support plate 122 is balanced with the elastic force of the elastic member 15, thereby improving the connection stability between the convex portion 121 and the power transmission bar 201; when the electrical connection device 1 is disassembled from the track 200, the convex portion 121 is separated from the power transmission bar 201, and the elastic member 15 pushes the support plate 122 to move in the direction away from the substrate 11, so that the power supply structure 12 is restored to its initial state, so as to facilitate the re-installation of the electrical connection device 1.

Specifically, the elastic member 15 is arranged in an arch shape between the support plate 122 and the substrate 11, and a highest point of the elastic member 15 abuts against a position of the corresponding convex portion 121 on the support plate 122, that is, the elastic member 15 abuts against the support plate 122 at the position where the distance between the elastic member 15 and the substrate 11 is the largest. The elastic member 15 extends from the substrate 11 toward the support plate 122, and a side of the elastic member 15 away from the substrate 11 is provided with an abutting surface 124, which can be in contact with the support plate 122. In a short side direction of the electrical connection device 1, a size of the elastic member 15 matches a size of the support plate 122, so that when the electrical connection device 1 is connected to the track 200, the elastic member 15 is not in contact with the track 200.

In the present example, since the side of the elastic member 15 away from the substrate 11 is provided with the abutting surface 124, when the power supply structure 12 abuts against the clastic member 15, the abutting surface 124 can fit with the support plate 122, that is, the clastic member 15 and the power supply structure 12 are in surface contact, so as to increase the abutting stability between the elastic member 15 and the power supply structure 12, so that a force-bearing area between the clastic member 15 and the power supply structure 12 is increased. In other examples, the abutting surface 124 may not be provided on the clastic member 15, that is, the elastic member 15 and the support plate 122 are in line contact, which is not limited herein.

In the present example, in a projection direction, the elastic member 15 and the support plate 122 are both arranged in a long strip shape, a conductive groove 202 is provided on the track 200, and the power transmission bar 201 is accommodated in the conductive groove 202. The elastic member 15 and the support plate 122 at least partially extend into the conductive groove 202, and the convex portion 121 abuts against the power transmission bar 201. In other examples, the conductive groove 202 may not be provided on the track 200. When the electrical connection device 1 is assembled with the track 200, the convex portion 121 directly abuts against the power transmission bar 201, which is not limited herein.

A boss 113 is further provided on the substrate, and the boss 113 extends from the substrate 11 toward the track 200. The clastic member 15 extends from the boss 113 in a direction away from the substrate 11. The power transmission bar 201 is provided at the bottom of the conductive groove 202. When the electrical connection device 1 is connected to the track 200, the boss 113, the elastic member 15 and part of the power supply structure 12 can all extend into the conductive groove 202 and make the convex portion 121 of the power supply structure 12 abut against the power transmission bar 201. On the one hand, it prevents the operator from touching the power transmission bar 201 during installation, and on the other hand, it realizes the limiting and electrical connection between the electrical connection device 1 and the track 200.

In the present example, two power supply structures 12 are provided, and the two power supply structures 12 are provided on the side of the substrate 11 away from the light-emitting component 3 and are located at the same end of the substrate 11 to transmit positive current and negative current respectively. Two conductive grooves 202 and two power transmission bars 201 are provided correspondingly, and the conductive grooves 202 are recessed from the track 200 toward the direction away from the substrate 11, and the power transmission bar 201 is provided at the bottom of the conductive grooves 202 to realize power supply to the light-emitting component 3. In other examples, the number of the power supply structures 12 can be set to other numbers, and the position of the power supply structures 12 can be provided at the middle position of the substrate 11, or at the side of the shell 2, that is, the power supply structure 12 extends from the electrical connection device 1 toward the shell 2 and extends outward through the shell 2. At this time, at least part of the shell 2 is accommodated in the track 200, and the power transmission bar 201 in the track 200 is correspondingly provided on the inner side surface of the track 200, so that the power supply structure 12 can be in contact with the power transmission bar 201, which is not limited herein.

In the present example, the elastic member 15 is a plastic member with plastic deformation, for example, a plastic member made of polycarbonate material. In other examples, the elastic member 15 can be a rubber product with elasticity. The elastic member 15 can also be other elastic parts, such as a torsion spring or a spring with a small size and good elasticity. As long as the power supply structure 12 can compress the elastic member 15 during assembly, and the clastic member 15 can push the power supply structure 12 to move when the external force disappears, which is not limited herein.

In the present example, the elastic member 15 is integrally formed with the substrate 11 to reduce the production cost of the electrical connection device 1 and improve the stability of the electrical connection device 1. In other examples, the elastic member 15 can be fixed to the substrate 11 by connecting glue or other components. For example, the elastic member 15 is fixed to the substrate 11 by screws, which is not limited herein.

Figure 4:
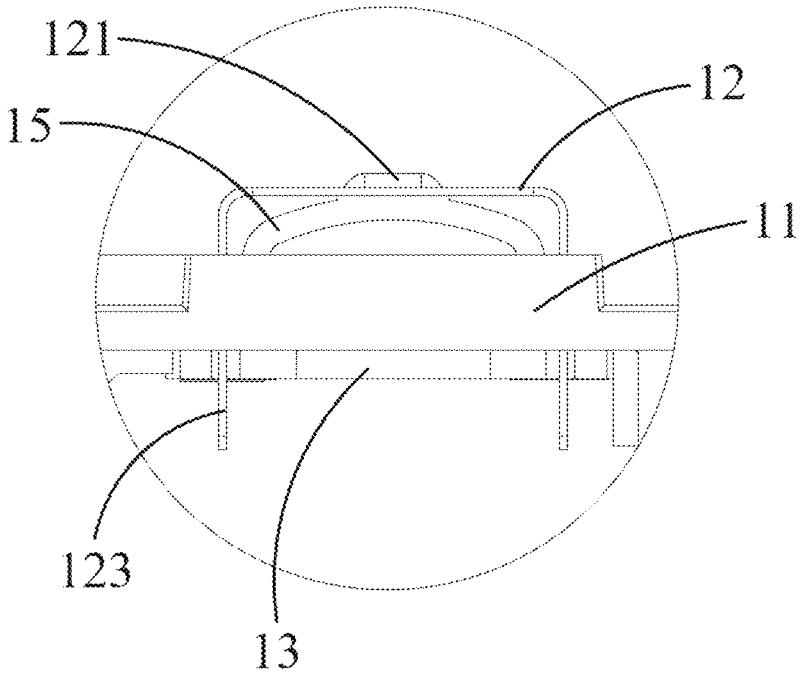
FIG. 4 is an enlarged view of portion A in FIG. 3.
Figure 5:
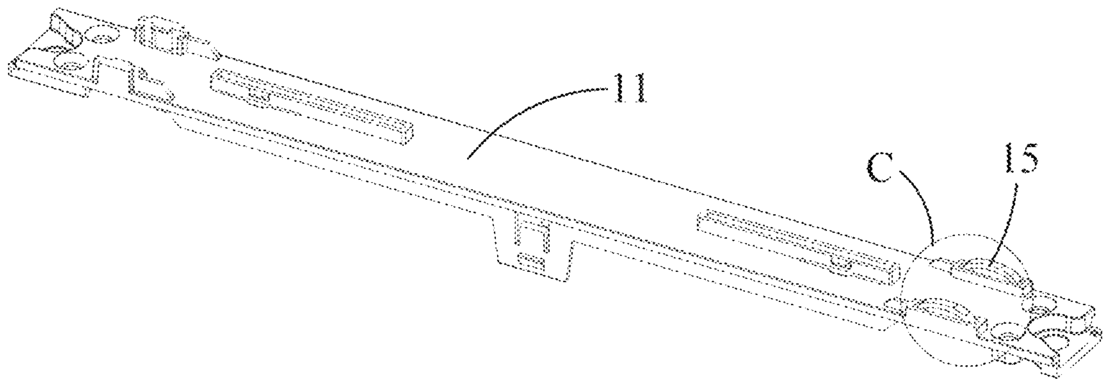
FIG. 5 is a schematic three-dimensional view of the substrate in FIG. 3.
Figure 6:
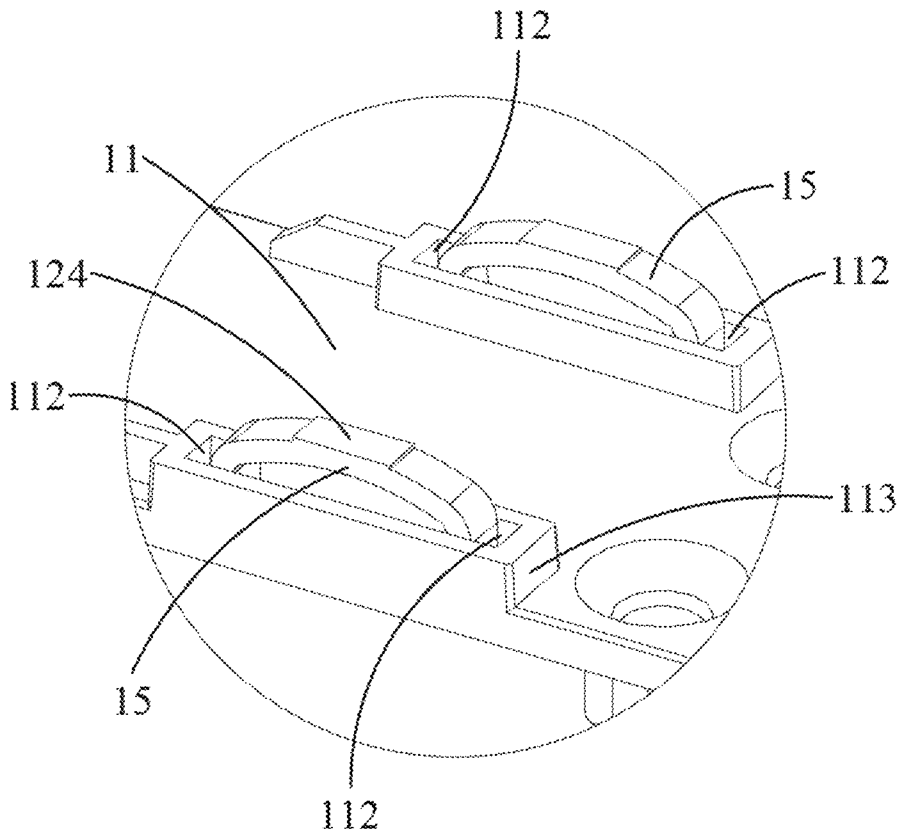
FIG. 6 is an enlarged view of the portion C in FIG. 5.
Figure 7:
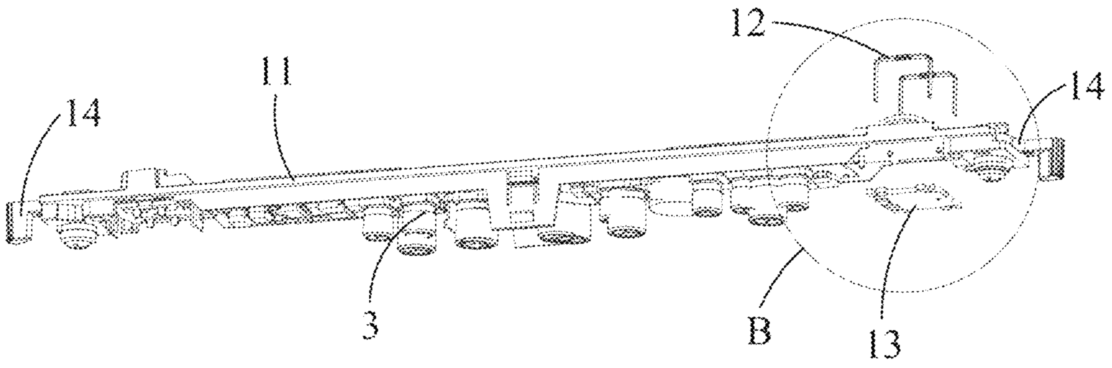
FIG. 7 is an exploded view of the electrical connection device in FIG. 3.
Figure 8:
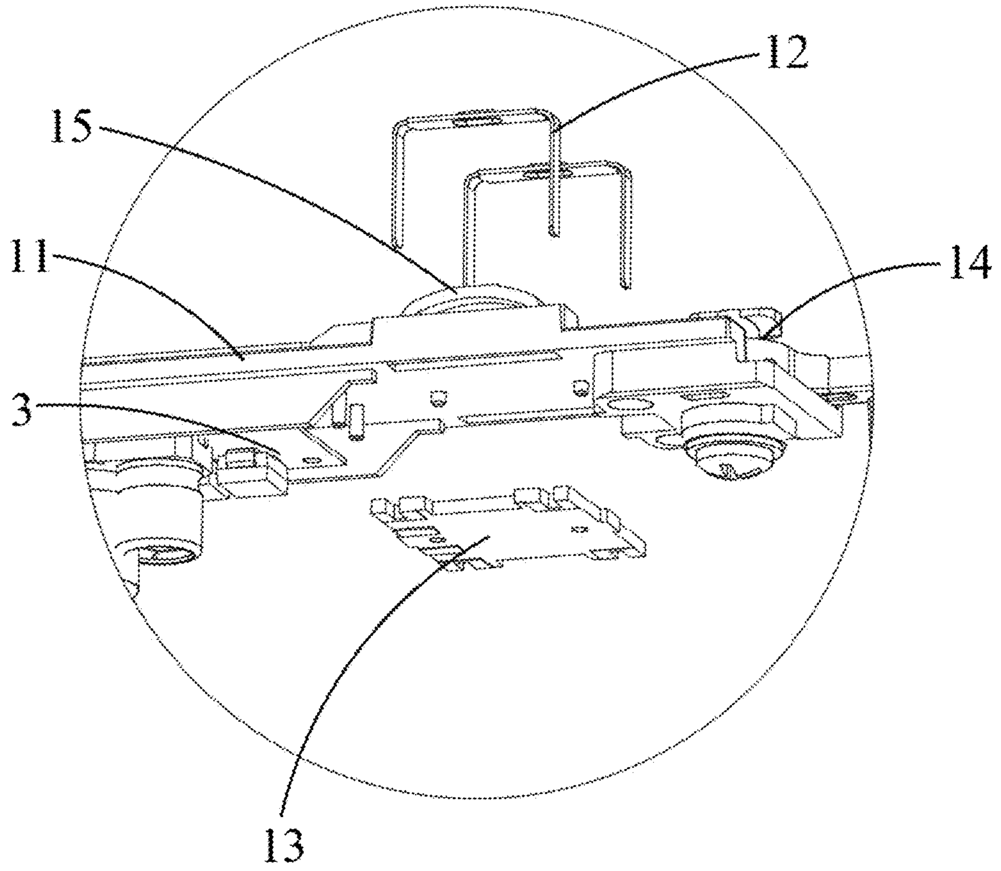
FIG. 8 is an enlarged view of the portion B in FIG. 7.

Referring to FIG. 3 and FIG. 4 and in combination with FIG. 7 and FIG. 8, the electrical connection device 1 further includes a circuit board 13, which is accommodated in the accommodation space of the shell 2, and one end of the circuit board 13 is connected to one end of the connecting part 123 away from the support plate 122, and the other end is connected to the light-emitting component 3, so as to realize the electrical connection between the power supply structure 12 and the light-emitting component 3. Specifically, the circuit board 13 is welded to the connecting part 123 and is not connected to the shell 2 or the substrate 11, so that the power supply structure 12 can drive the circuit board 13 to move synchronously in the track 200, on the one hand, the stable connection between the power supply structure 12 and the circuit board 13 is realized, and on the other hand, preventing the connecting parts 123 from falling off from the through holes 112. The circuit board 13 and the light-emitting component 3 are connected by a flexible wire (not shown), so that the circuit board 13 can move relative to the light-emitting component 3 while being electrically connected to the light-emitting component 3, in which the flexible wire is a soft wire that can conduct electricity and deform.

During assembly, first, the connecting parts 123 are passed through the through holes 112, and the other ends of the connecting parts 123 away from the supporting plate 122 are welded to the circuit board 13, and then the circuit board 13 and the light-emitting component 3 are connected through a flexible wire, and then the substrate 11 and the shell 2 are assembled, and then the supporting plate 122 and the elastic member 15 are correspond to the conductive groove 202 on the track 200, and pressure is applied to the lamp 300, so that the supporting plate 122 extends into the conductive groove 202 and the convex portion 121 abuts against the power transmission bar 201, and at the same time, the elastic member 15 is stressed until the lock catch 14 can be accommodated in the lock buckle groove 203 and the lock catch 14 is rotated to realize the locking of the electrical connection device 1 and the track 200, and realize the electrical connection between the lamp 300 and the track 200; during disassembly, the lock catch 14 is rotated so that the lock catch 14 falls off from the lock buckle groove 203. At this time, the power supply structure 12 extends outward to the initial position under the push of the elastic member 15, which is convenient for the lamp 300 to be assembled again.

In summary, the electrical connection device 1 of the present disclosure sets an clastic member 15 between the power supply structure 12 and the substrate 11, so that the power supply structure 12 can move toward the substrate 11 when subjected to the external pressure. When the external pressure disappears, the power supply structure 12 can move in the direction away from the substrate 11 under the action of the elastic member 15, thereby avoiding deformation of the power supply structure 12 and realizing repeated installation and use of the electrical connection structure; by setting the through holes 112 on the substrate 11, the power supply structure 12 is movably connected to the substrate 11, further avoiding deformation of the power supply structure 12 after being subjected to external force; by setting the circuit board 13 to be welded to the connecting part 123, a stable connection between the circuit board 13 and the power supply structure 12 is achieved; by connecting the circuit board 13 and the light-emitting component 3 through a flexible wire, the circuit board 13 can be moved relative to the light-emitting component 3; by setting the power supply structure 12 to be U-shaped, the connection between the power supply structure 12 and the substrate 11 is more stable.

The purpose of the present disclosure is to provide a track lamp to at least solve one of the problems of poor plastic resilience of copper sheets, difficulty in obtaining electricity, and inconvenience in repeated installation of the lamp.

To achieve the above-mentioned purpose, the present disclosure provides a track lamp, which comprises a track and an electrical connection device in electrical contact with the track, in which the electrical connection device comprises a substrate, a power supply structure plugged and fixed on the substrate, and an elastic member arranged between the substrate and the power supply structure, the power supply structure is provided with a convex portion, to be in electrical contact with a power transmission bar in the track; and the clastic member is configured to generate elastic deformation in a case that the convex portion and the power transmission bar are pressed against each other, so that the convex portion and the power transmission bar are kept abutting against with each other.

Optionally, the elastic member and the substrate are integrally formed.

Optionally, the power supply structure is arranged in an inverted U shape, the power supply structure comprises a horizontally extending support plate and connecting parts respectively vertically connected to two ends of the support plate, and the convex portion is arranged on a side of the support plate facing the power transmission bar.

Optionally, the clastic member is arranged in an arch shape between the substrate and the support plate, and a highest point of the elastic member abuts against a position of a corresponding convex portion on the support plate.

Optionally, the substrate is provided with through holes for the connecting parts to pass through, and the through holes are provided with two matching the connecting parts respectively.

Optionally, in a length direction of the track lamp, the elastic member is located between the two through holes.

Optionally, an abutting surface is provided on a side of the elastic member away from the substrate, and the abutting surface is in contact with the support plate.

Optionally, the substrate is further provided with a boss, the clastic member extends from the boss in a direction away from the substrate, the track is provided with a conductive groove, the power transmission bar is arranged at a bottom of the conductive groove, the boss and the elastic member can extend into the conductive groove and make the convex portion abut against the power transmission bar.

Optionally, the track lamp further comprises a shell and a light-emitting component accommodated in the shell, the electrical connection device is arranged on the top of the shell and comprises a circuit board electrically connected to the light-emitting component, the convex portion of the power supply structure is electrically abutted against the power transmission bar, and an end of the power supply structure away from the convex portion passes through the substrate and is electrically connected to the circuit board.

Optionally, the circuit board and the light-emitting component are connected via a flexible wire, and the power supply structure and the circuit board are welded, so that the power supply structure can drive the circuit board to move in the track.

The beneficial effects of the present disclosure are as follows: the track lamp of the present disclosure arranges an elastic member between the power supply structure and the substrate so that the power supply structure can move toward the substrate when subjected to external pressure; when the external pressure disappears, the power supply structure can move in a direction away from the substrate under the action of the elastic member, thereby avoiding deformation of the power supply structure and realizing repeated installation and use of the electrical connection device.

The above examples are only used to illustrate the technical solutions of the present disclosure and are not to limited to these. Although the present disclosure has been described in detail with reference to the examples, those skilled in the art should understand that the technical solutions of the present disclosure can be modified or equivalently replaced without departing from the spirit and scope of the technical solution of the present disclosure.

The invention claimed is:

1. A track lamp, comprising:

a track with a power transmission bar; and an electrical connection device in electrical contact with the track and comprising a substrate, a power supply structure plugged and fixed on the substrate and having a convex portion in electrical contact with the power transmission bar, and an elastic member arranged between the substrate and the power supply structure, wherein the power supply structure comprises a horizontally extending support plate and connecting parts respectively vertically connected to two ends of the support plate, to form an inverted U shape, and the convex portion is arranged on a side of the support plate facing the power transmission bar; and wherein the elastic member is configured to bias the convex portion and the power transmission bar against and in contact with each other.

2. The track lamp according to claim 1, wherein the elastic member and the substrate are integrally formed.

3. The track lamp according to claim 1, wherein the elastic member forms an arch shape between the substrate and the support plate, a highest point of the elastic member abutting against a position of a corresponding convex portion on the support plate.

4. The track lamp according to claim 1, further comprising an abutting surface provided on a side of the elastic member away from the substrate, and the abutting surface is in contact with the support plate.

5. The track lamp according to claim 1, further comprising a boss formed in the substrate; and a conductive groove provided in the track, wherein the elastic member extends from the boss in a direction away from the substrate, the power transmission bar is arranged at a bottom of the conductive groove, and the boss and the elastic member extend into the conductive groove to make the convex portion abut against the power transmission bar.

6. The track lamp according to claim 1, further comprising through holes formed in the substrate, with the connecting parts passing through the through holes.

7. The track lamp according to claim 6, wherein the elastic member is located between the two through holes in a length direction of the track lamp.

8. The track lamp according to claim 1, further comprises a shell; a light-emitting component accommodated in the shell; and a circuit board electrically provided in the electrical connection device and connected to the light-emitting component, wherein an end of the power supply structure away from the convex portion passes through the substrate and is electrically connected to the circuit board.

9. The track lamp according to claim 8, further comprising a flexible wire connecting the circuit board and the light emitting component.

* * * * *